Jan. 16, 1968

C. G. HEBEL ETAL 3,363,418

HYDRAULIC REMOTE CONTROL SYSTEM

Filed Oct. 1, 1965

Carl G. Hebel
James C. Herman
Louis Rossi
INVENTORS

BY *Clarence A. O'Brien*
and *Harvey B. Jacobson*
Attorneys

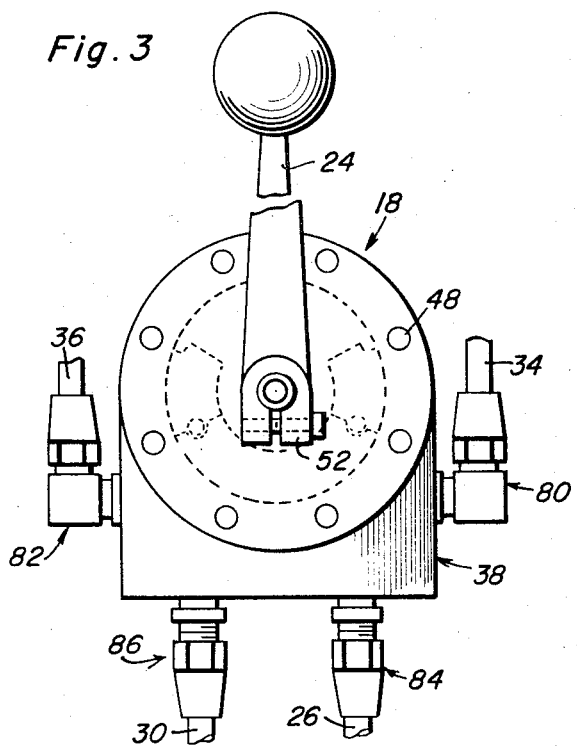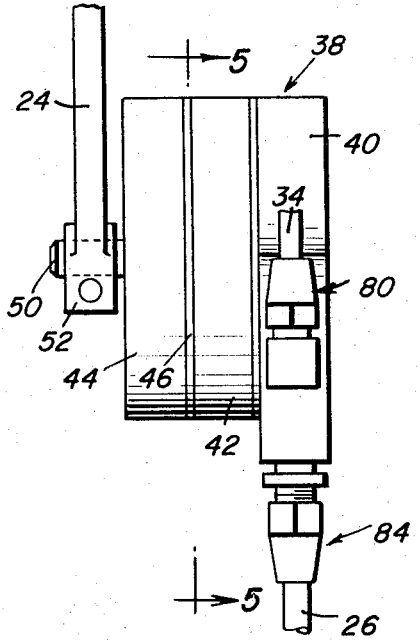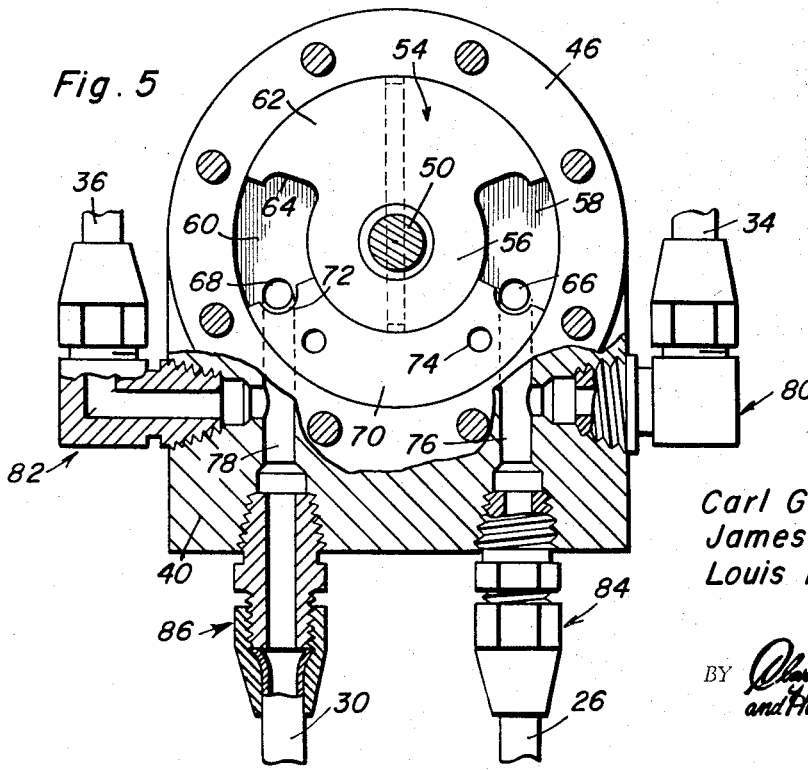

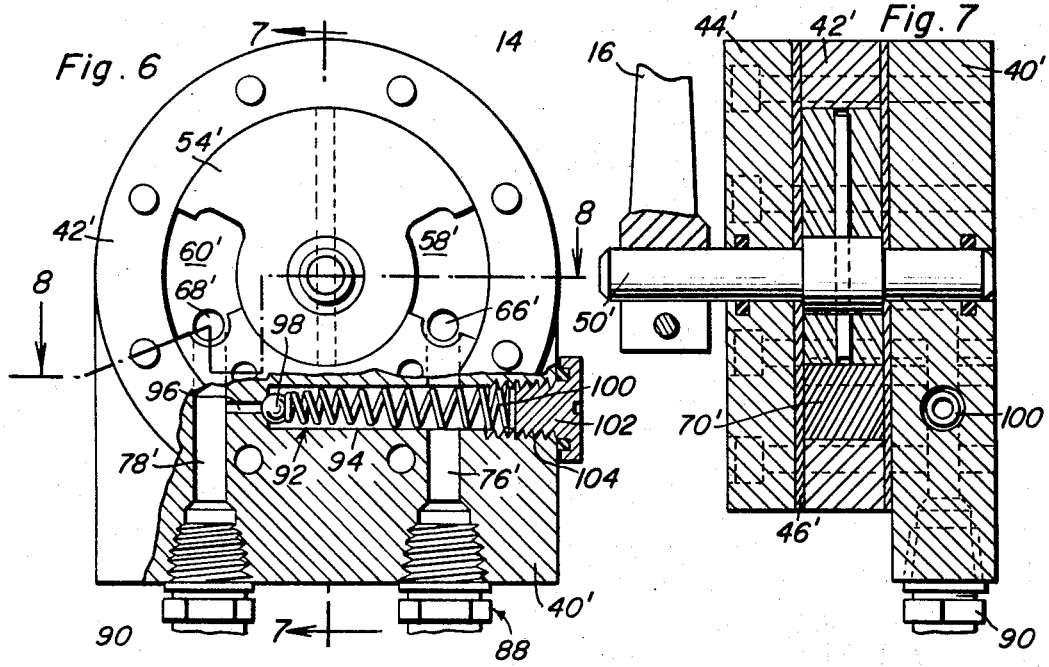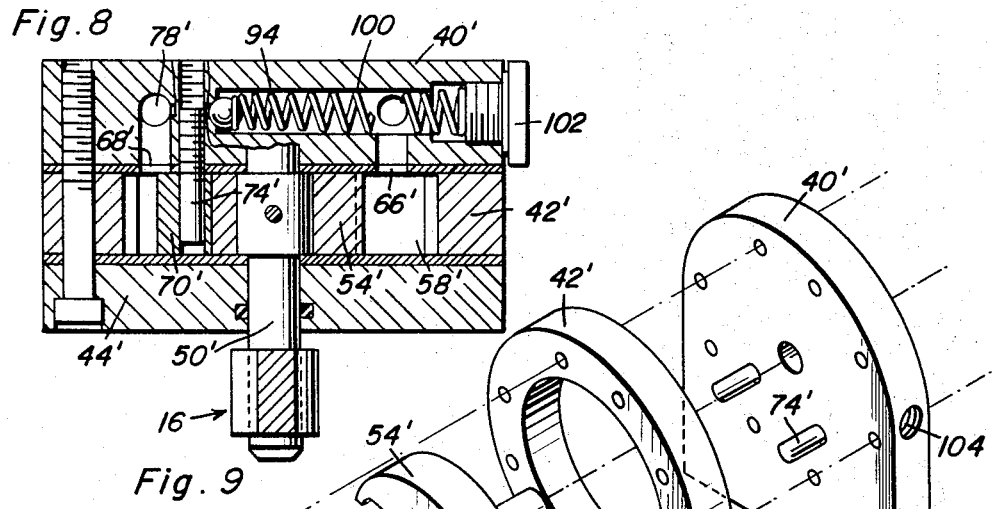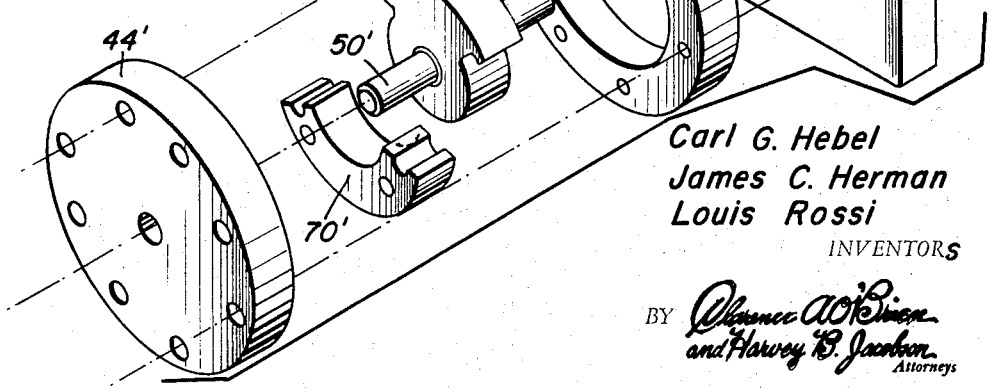

Carl G. Hebel
James C. Herman
Louis Rossi
INVENTORS

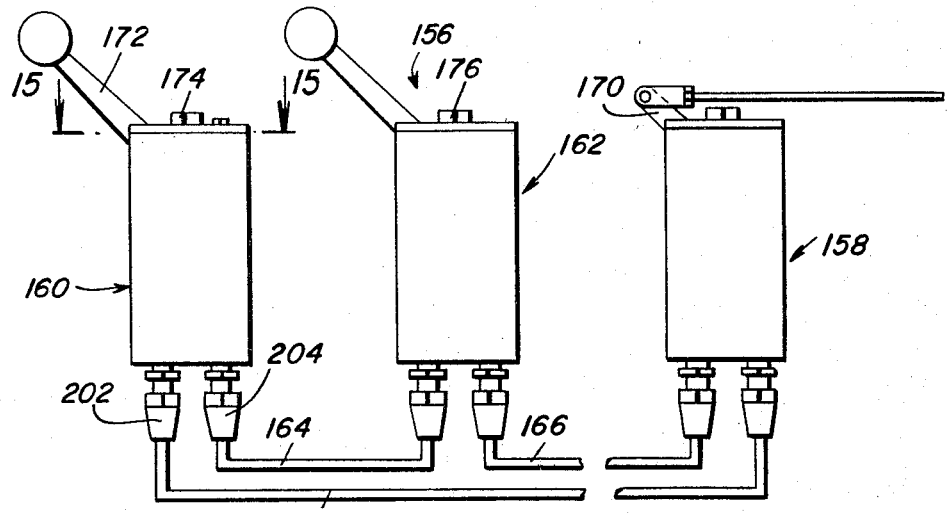
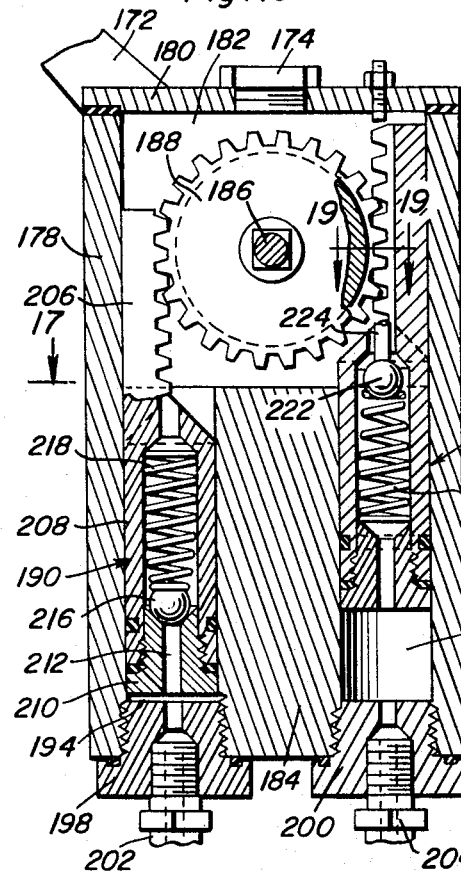
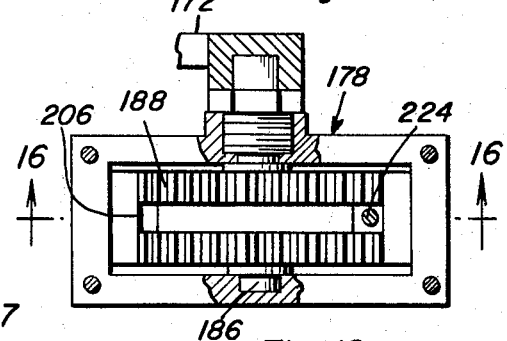
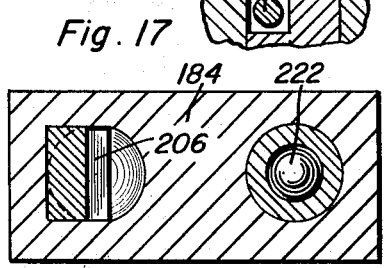
Carl G. Hebel
James C. Herman
Louis Rossi  INVENTORS

United States Patent Office 3,363,418
Patented Jan. 16, 1968

3,363,418
HYDRAULIC REMOTE CONTROL SYSTEM
Carl G. Hebel, 390 Jefferson Ave., Haworth, N.J. 07641;
James C. Herman, 146 Central Ave., Bogota, N.J. 07603; and Louis Rossi, 41 Washington Ave., Hillsdale, N.J. 07642
Filed Oct. 1, 1965, Ser. No. 491,934
4 Claims. (Cl. 60—54.5)

ABSTRACT OF THE DISCLOSURE

A closed fluid circuit through which any one of a plurality of remote control elements may operate a controlled element. An arrangement of check valves and transfer valves in the fluid circuit together with a fluid reservoir provide for refilling the circuit with fluid and purging it of entrapped air due to fluid leakage.

This invention relates to a fluid operated motion transmitting system and in particular to a hydraulic remote control apparatus capable of actuating mechanism of different types from one or more remote locations.

A primary object of the present invention is to provide a hydraulic type of remote control system having facilities for filling itself with a relatively incompressible fluid medium and purging compressible fluid therefrom such as air.

A further important object of the present invention is to provide a hydraulic type of remote control system having its own facilities for synchronizing the motion of the drive and driven elements.

Yet another object of the present invention is to provide a hydraulic type of remote control system which has facilities for automatically compensating for changes in temperature producing volumetric variations in the fluid medium.

In accordance with the foregoing objects, the hydraulic remote control system of the persent invention involves a closed fluid circuit within which a plurality of piston drive units are connected in series so that motion imparted to one of the drive units will be transmitted to the other drive units by displacement of the fluid medium within the closed fluid circuit.

It will be appreciated, however, that depletion of the fluid medium within the closed fluid circuit because of leakage or other causes will require refilling and purging of any air entrapped therewithin. The system of the present invention therefore also includes its own reservoir containing a relatively incompressible fluid medium under atmospheric pressure with an arrangement of valves for establishing fluid communication between the reservoir and the closed fluid circuit under control of one of the piston drive units in order to refill the fluid circuit as well as to purge any air entrapped therewithin. Accordingly, transfer valves are also associated with the fluid circuit so that fluid may be sequentially conducted from one piston unit to the other during the filling operation. The aforementioned valve arrangements are also operative to accommodate synchronization of the system because of any deficiency or excess of fluid medium within the closed fluid circuit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a front elevational view of one of the piston drive units associated with the system shown in FIGURE 1;

FIGURE 4 is a side elevational view of the piston drive unit shown in FIGURE 3;

FIGURE 5 is an enlarged sectional view taken substantially through a plane indicated by section line 5—5 in FIGURE 4 with parts broken away and shown in section;

FIGURE 6 is a sectional view similar to that of FIGURE 5 through another of the piston drive units associated with the system shown in FIGURE 1;

FIGURE 7 is a side sectional view taken substantially through a plane indicated by section line 7—7 in FIGURE 6;

FIGURE 8 is a sectional view taken substantially through a plane indicated by section line 8—8 in FIGURE 6;

FIGURE 9 is a perspective view of some of the disassembled parts of one of the piston drive units;

FIGURE 14 is a front elevational view of a modified form of hydraulic remote control system in accordance with the present invention;

FIGURE 15 is a top sectional view with parts broken away and shown in section taken substantially through a plane indicated by section line 15—15 in FIGURE 14;

FIGURE 16 is a longitudinal sectional view taken substantially through a plane indicated by section line 16—16 in FIGURE 15;

FIGURE 17 is a transverse sectional view taken substantially through a plane indicated by section line 17—17 in FIGURE 16;

FIGURE 18 is a perspective view of one of the piston members associated with the piston drive units of the system illustrated in FIGURES 14–17; and FIGURE 19 is an enlarged partial sectional view taken substantially through a plane indicated by section line 19—19 in FIGURE 16.

Figure 1:
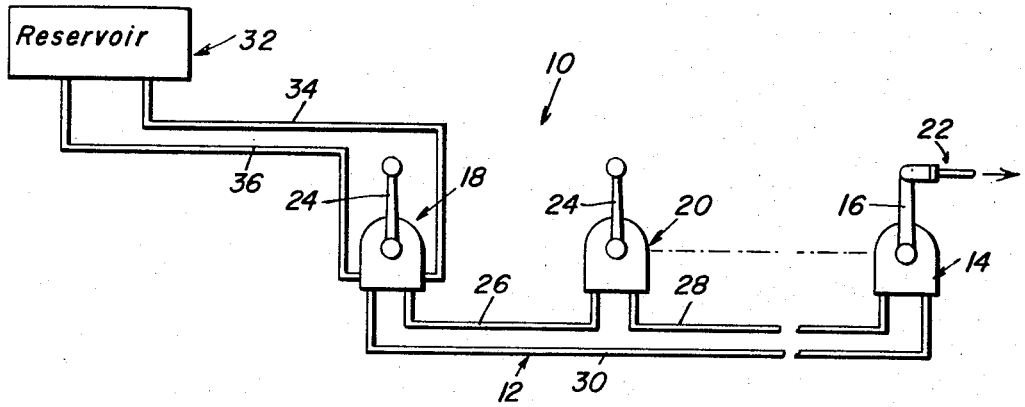
FIGURE 1 is a schematic illustration of the system of the present invention.

Referring now to the drawings in detail and initially to FIGURE 1, it will be noted that the remote control system of the present invention is generally denoted by reference numeral 10 comprising a plurality of piston drive units hydraulically interconnected in series with each other by a closed fluid circuit generally referred to by reference numeral 12. The piston drive units are similar in construction to each other and include a slave unit 14 to which a driven element 16 is connected, motion being transmitted to the driven element through the driven or slave unit 14 by any one of a plurality of the other drive units including a master drive unit 18 and an intermediate drive unit 20. The driven element 16 is adapted to be connected to any suitable mechanism to be controlled such as the carburetor of an engine by means of a connecting linkage 22. Thus, motion may be transmitted to the driven element 16 from any of a plurality of remote locations at which the drive units 18 and 20 are located. Motion is transmitted to the driven element in synchronization with manual displacement of a drive control lever 24 connected to the master drive unit 18 and the intermediate drive units 20 by displacement of a relatively incompressible fluid medium. Accordingly, the drive units 18, 20 and 14 are interconnected in series by connecting conduits 26, 28, 30, the connecting conduit 30 interconnecting the final slave unit 14 with the master unit 18. It will therefore be apparent that the driven element 16 may be controlled from a plurality of remote locations as long as the fluid operating medium completely fills the closed fluid circuit 12 under a predetermined operating pressure. Fluid for filling the closed fluid circuit 12 is supplied from a reservoir 32 through the conduit 34 connecting the reservoir to the master drive unit 18. Excess fluid from the fluid circuit may also be returned to the reservoir through conduit 36 connecting the master drive unit 18 to the reservoir.

Figure 13:
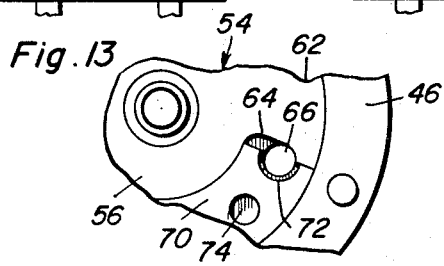
FIGURE 13 is a partial view through one of the piston drive units corresponding to the views shown in FIGURES 5 and 6 but showing the piston unit in another operative position.

Referring now to FIGURES 3, 4 and 5, it will be observed that the master drive unit 18 includes a piston chamber body 38 made up of sections 40, 42 and 44 which are separated by sealing gaskets 46. The housing sections are held in assembled relation by means of a plurality of circumferentially spaced fastener assemblies 48. A piston shaft 50 extends through the housing section 42 and is rotatably mounted between the housing sections 40 and 44. The drive lever 24 is connected to the piston shaft axially projecting from the housing section 44 by means of the clamping hub portion 52. Connected to the piston shaft within the housing section 42 is an oscillatable piston member 54. The housing section 42 encloses an annular cavity about the hub portion 56 of the piston member so as to form expansible chambers 58 and 60 on opposite ends of the radially outer portion 62 of the piston member. Each end of the radially outer portion of the piston member is formed with a recess 64 so as to avoid closing of ports 66 and 68 which communicate with the chambers 58 and 60 at opposite arcuate ends of a stationary block 70 mounted within the annular cavity of the housing section 42. The ends of the block 70 are therefore also provided with recesses 72 to avoid closing of the ports 66 and 68 and yet limit the reciprocatory stroke of the piston member between positions at which it abuts the block 70 at its opposite ends without covering the ports 66 and 68. Accordingly, the piston member 54 will assume a position such as shown in FIGURE 13 when it is at one end of its reciprocatory stroke. The block 70 is therefore held in its stationary position within the annular cavity of the housing section 42 by means of the pins 74 in order to limit the stroke of the piston member. It will be further apparent that when the piston member is angularly displaced by means of the lever 24 in a clockwise direction as viewed in FIGURE 5, any fluid trapped within the chamber 58 will be pressurized and flow out of port 66. The port 66 is connected to a fluid passage 76 formed within the housing section 40. Similarly, a fluid passage 78 is formed within the housing section 40 in communication with the chamber 60 through port 68 so that fluid may flow into passage 78 from a chamber 60 when the piston member is displaced in a counterclockwise direction as viewed in FIGURE 5. In the case of the master drive unit 18, the fluid passage 76 within the housing section 40 is connected by fitting 80 to the supply conduit 34 from the reservoir while the passage 78 is connected by the fitting 82 to the conduit 36. The passages 76 and 78 are also respectively connected by the fittings 84 and 86 to the connecting conduits 26 and 30 of the closed fluid circuit.

The slave unit 14 as well as the intermediate drive units 20 are similar in construction to the master unit 18. Accordingly, the slave unit 14 as shown in FIGURES 6 through 9 includes a housing body made up of sections 40', 42' and 44' separated by sealing gaskets 46' and interconnected in assembled relation to each other by circumferentially spaced fasteners. A piston member 54' is also mounted within the housing section 42' and is connected to a piston shaft 50' to which the drive element 16 is connected. The housing section 40' also includes fluid passages 76' and 78' which respectively communicate with the expansible chambers 58' and 60' through ports 66' and 68'. The passages 76' and 78' are respectively connected by fittings 88 and 90 to the connecting conduits 28 and 30 of the closed fluid circuit so that fluid under pressure may be supplied to the expansible chambers 58' or 60' in order to effect pivotal displacement of the piston member 54' between limit positions determined by the block 70' fixedly mounted within the cavity of the housing section 40 as more clearly seen in FIGURE 9. The slave unit 14 as well as the intermediate units 20 differ from the master drive unit 18 in that the fluid passages which communicate with the expansible chambers are interconnected by a transfer valve assembly generally referred to by reference numeral 92. The transfer valve assembly is therefore mounted in the housing section 40' and includes a valve bore 94 which extends from one side of the housing section in perpendicular intersecting relation to the passage 76'. The bore 94 communicates with the passage 78' through a valve passage 96 which is closed by means of a one-way check valve element 98. The ball valve element 98 is adapted to open the passage 96 in order to establish a fluid connection between the passages 76' and 78' bypassing the chambers 58' and 60' when the pressure within the passage 78' exceeds a predetermined operating pressure. Accordingly, the ball valve element 98 is maintained seated by means of a spring element 100 which is disposed within the bore 94 and reacts against the inner end of a sealing plug 102 threadedly received within the internally threaded portion 104 of the bore as more clearly seen in FIGURES 6 and 8.

Except for the driven element 16 the intermediate drive unit 20 is identical in construction and operation to the slave unit 14 and is connected in series thereto by the connecting conduit 28 so that when the piston member within the drive unit 20 displaces fluid through conduit 28, a corresponding displacement of the piston member 54' within the slave unit 14 will occur which in turn will displace fluid through conduit 30 into one of the expansible chambers within the master unit 18 then being expanded. Fluid within the closed circuit conduits 26, 28 and 30 is derived from the fluid reservoir 32 as aforementioned.

Figure 2:
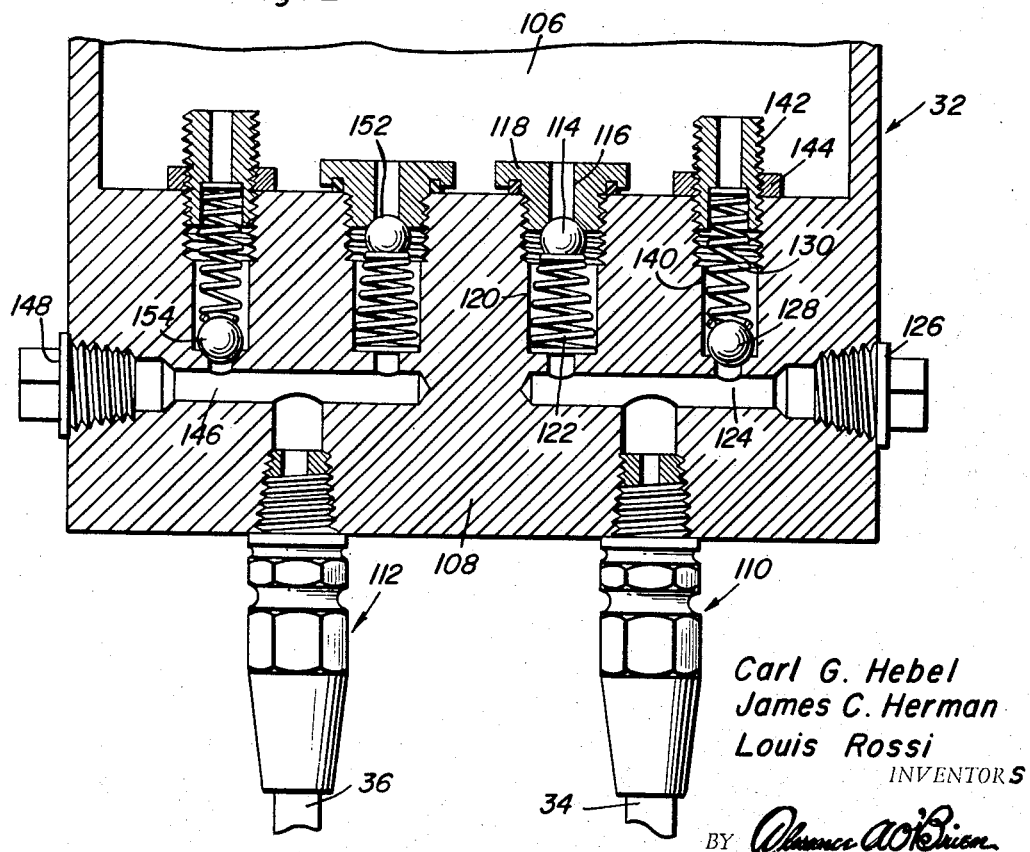
FIGURE 2 is an enlarged partial sectional view through the reservoir portion of the system shown in FIGURE 1.

Referring now to FIGURE 2 in particular, it will be noted that the reservoir 32 includes a fluid containing chamber 106 disposed above a valve block portion 108 to which the conduits 34 and 36 are connected by the fittings 110 and 112. A relatively incompressible fluid or liquid such as oil under atmospheric pressure is disposed within the reservoir chamber 106. Fluid from the reservoir chamber may thereby be supplied to the closed fluid circuit of the system through conduit 34 upon opening of the one-way check valve 114 normally closing the fluid passage 116 formed in the sealing cap 118. The sealing cap is therefore threadedly received within the internally threaded portion of the valve bore 120 within which the valve biasing spring 122 is seated. Fluid communication is established between the bore 120 and the conduit 34 by means of the connecting passage 124 which extends into the valve body portion 108 of the reservoir and is closed by the plug 126. It will therefore be apparent that when sufficient suction pressure is developed within the conduit 34 determined by the value of the spring pressure 122, the one-way check valve 114 will open in order to admit fluid under pressure into the fluid circuit. On the other hand, when the pressure of the fluid within that portion of the fluid circuit with which the conduit 34 communicates is excessive, the one-way check valve 128 will open against the bias of the spring 130. The connecting passage 124 therefore communicates with the reservoir through the bore 140 upon opening of the check valve 128. The bore 140 threadedly receives an externally threaded passage member 142 within which the spring 130 is seated. Member 142 is also held in axially adjusted position by means of the nut 144 in order to regulate the spring pressure.

The conduit 36 communicates through a fitting 112 with a connecting passage 146 formed in the valve block portion 108 and closed by the plug 148 so that fluid communication may be established with the reservoir chamber 106 upon opening of the one-way check valves 152 and 154. The check valve 152 is similar in construction and installation to the check valve 114 but opens to supply fluid under atmospheric pressure to the conduit 36 in order to satisfy a fluid deficiency in the fluid circuit. The one-way check valve 154 on the other hand will open in response to development of an excessive pressure within the fluid circuit communicated to the conduit 36 resulting in the return of excess fluid to the reservoir. Accordingly, the one-way check valve 154 is similar in construction, installation and operation to the one-way check valve 128. Also, while the liquid in reservoir chamber 106 is maintained under atmospheric pressure, it will be appreciated that other reference pressures above atmosphere could be utilized.

Figure 10:
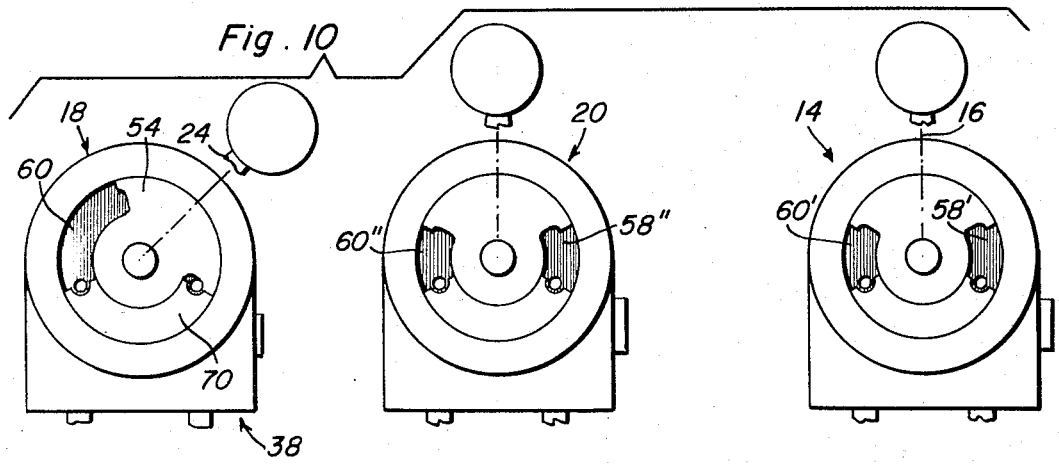
FIGURES 10 through 12 are simplified diagrammatic illustrations of the piston drive units showing the procedure for filling the system with the fluid medium.
Figure 11:
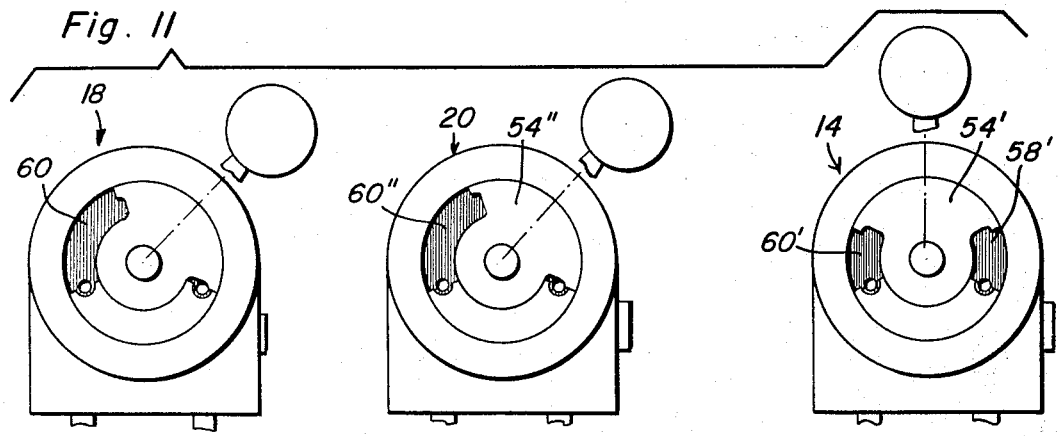
Figure 12:
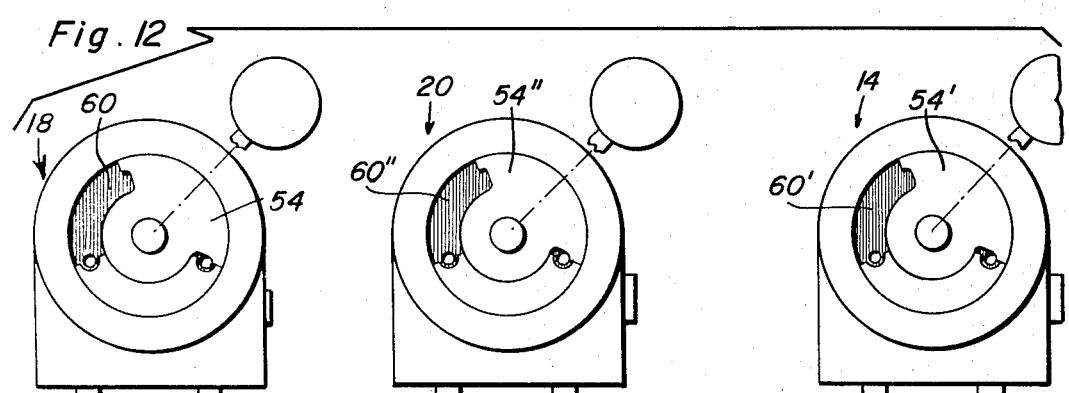

As hereinbefore indicated, motion may be transmitted to the slave unit 14 by manual displacement of the control lever 24 associated with any of the intermediate drive units 20 or the master drive unit 18 by displacing the fluid medium through the closed fluid circuit 12 which interconnects the expansible chambers within the respective drive units. However, in order to be in a proper operative condition, the fluid circuit must be completely filled with a relatively incompressible fluid. In order to fill the system with such fluid from the reservoir 32 should the system be depleted of its fluid medium, it will be necessary to manipulate the master unit 18 by oscillation of the control lever 24 between its limit positions. When the piston member 54 is thereby displaced in a counterclockwise direction as viewed in FIGURE 5, expansion of the chamber 58 will develop a suction pressure therewithin. The suction pressure will be communicated through conduit 34 to the passage 124 within the fluid reservoir so that the atmospheric pressure exerted on the fluid within the reservoir chamber 106 will open filling check valve 114. Fluid under atmospheric pressure will therefore flow through passage 124, conduit 34 and passage 76 into the expanding chamber 58 until the piston member 54 reaches the end of its counterclockwise stroke. As the piston member 54 is displaced to its clockwise limit position, the fluid previously supplied to chamber 58 will be displaced through conduit 26 into the chamber 60" of the intermediate unit 20 as shown in FIGURE 10. FIGURE 10 therefore shows the relative positions that will be occupied by the piston members within the drive units when the system is depleted of its fluid operating medium. It will therefore be apparent that continued oscillatory movement imparted to the piston member 54 of the master drive unit 18 will intermittently supply a charge of fluid from the reservoir to the chamber 60" of the intermediate drive unit 20 until sufficient pressure is developed therewithin to displace the piston member 54" to its clockwise limit position as shown in FIGURE 11. Further oscillation of the piston member 54 within the master unit after the piston member 54" is in its clockwise limit position shown in FIGURE 11, will increase the pressure within the chamber 60" above operating value so as to open the one-way transfer check valve associated with the drive unit 20 as described in connection with the check valve 98 of the slave unit 14. Thus, continued pumping of the master unit will open the transfer check valve in order to establish a fluid bypass path directly conducting the fluid medium to the connecting conduit 28 for filling the expansible chamber 60' within the slave unit 14. Successive filling of the chambers within the drive units by continued oscillating movement of the piston member 54 within the master unit will therefore ultimately charge the chamber 60' within the slave unit 14 as shown in FIGURE 12 and complete the filling of the fluid circuit with the fluid medium from the reservoir. Further, as each of the series connected chambers of the drive units are successively filled with fluid, by flow of fluid in one direction through the transfer check valves 98, any air or compressible fluid entrapped within the fluid circuit will be displaced in the same direction for return through conduit 30 to the reservoir from which it is vented. Such purging of the entrapped air occurs because of the suction pressure developed within the chamber 60 of the master unit 18 when the chamber 60 is expanding inducing flow through the conduit 30. Accordingly, once the fluid medium reaches the conduit 30 it will push the entrapped air through conduit 36 into the passage 46 of the reservoir so that it may be discharged upon opening of the check valve 154 when the fluid circuit is completely filled or charged with the incompressible fluid at an operating pressure sufficient to open the check valve 154. Once the operating pressure corresponding to a completely filled fluid circuit is achieved, the filling check valve 114 will close so that the reservoir will be effectively disconnected from the closed fluid circuit. At this time, the piston members of all of the drive units will be synchronized as shown in FIGURE 12.

It will be appreciated that when the system is synchronized the piston members in all of the drive units will always assume the same angular positions and will remain in such positions when manual displacing force is removed from the drive unit 18 or 20 being manipulated, because of the friction between the parts and the operating fluid pressure within the system. Should the system assume a condition out of synchronization because of an excess of fluid in one chamber and a deficiency of fluid in the other chamber of a drive unit, the system may be synchronized once again by manipulating the actuating lever 24 of the master drive unit 18. For example, let us assume that the system is out of synchronization as evidenced by the failure of the piston member 54' of the slave unit 14 to assume the extreme clockwise limit position when the piston member 54 of the other drive units assume their extreme clockwise positions. Thus, when the piston member 54 is displaced counterclockwise, it will displace the piston member 54' to its extreme counterclockwise poistion before the piston member 54 reaches its extreme counterclockwise position. Therefore, continued movement of the piston member 54 toward its counterclockwise position will increase the pressure within the chamber 60 beyond the maximum operating pressure causing flow of fluid through conduit 36 into the reservoir chamber 106 by opening check valve 154. Accordingly, the excess fluid in the fluid circuit is removed so as to restore synchronization. On the other hand, if the system is not synchronized because of a deficiency as evidenced by failure of the piston members 54' or 54" to reach their extreme counterclockwise positions when the piston member 54 of unit 18 reaches its counterclockwise limit position, the deficiency may be made up through the master unit in order to synchronize the system. Displacement of the piston member 54 of the master unit to its extreme clockwise limit position will then produce a pressure within the contracting chamber 58 exceeding the maximum operating pressure of the system causing bypass flow of the excess pressure fluid through the transfer check valves 92 associated with the drive units 20 and 14 in order to displace the excess fluid into the deficient portions of the fluid circuit including the chambers 58', 58" and conduit 30. Any excessive change in the pressure of the closed fluid circuit because of ambient temperature changes will also be compensated for. Accordingly, any rise in ambient temperature which produces an excessive volumetric expansion of the operating fluid will open either one of or both of the check valves 128 and 154 in order to return excess fluid to the reservoir chamber. On the other hand, a decrease in ambient temperature causing a volumetric contraction of the operating fluid within the fluid circuit will cause opening of one of or both of the check valves 114 and 152 should the operating pressure decline to too low a value. Additional fluid from the reservoir chamber 106 will then be admitted into the fluid circuit in order to restore the volume and pressure of the operating fluid to its proper value.

Referring now to FIGURE 14, another form of hydraulic remote control system 156 is shown which embodies the same basic operating principles associated with the system 10 hereinbefore described in connection with FIGURE 1. The control system 156 also includes a slave unit 158, a master unit 160 and as many intermediate drive units 162 as desired. The drive units 160, 162 and 158 are interconnected in series by the conduits 164,166 and 168 to form a closed fluid circuit as hereinbefore described in connection with system 10 of FIGURE 1. Also, the slave unit 158 is operative to displace a driven element 170 synchronized with the displacement of drive levers 172 associated with the drive units 160 and 162. All of the drive units are identical in construction except that the master unit 160 is provided with a reservoir closing cap 174 which vents the reservoir chamber formed therewithin to atmosphere whereas the reservoir closing caps 176 associated with the drive units 158 and 162 are arranged to substantially seal the reservoir chambers formed therewithin under a pressure above atmosphere. It will therefore become apparent that the system 156 differs from system 10 in eliminating the use of a separate reservoir.

Referring now to FIGURES 15 through 19, it will be observed that each of the drive units includes a housing 178 having an upper open end sealed by a cover plate member 180 within which the reservoir closing cap 174 or 176 is mounted. The closing plate 180 encloses within the housing 178, a reservoir chamber 182 disposed above a piston block portion 184. A drive shaft 186 is rotatably mounted by the housing and extends through the chamber 182 for rotatably supporting a gear member 188. The shaft 186 projects from the housing and is connected to the drive lever 172 in the case of the drive units 160 and 162 and the driven element 170 in the case of the slave unit 158. Accordingly, angular displacement is imparted to the gear member 188 by the lever 172 or the gear member transfers angular displacement to the driven element 170. Slidably mounted by the piston block portion 184 of the housing are a pair of piston assemblies 190 and 192. Expansible chambers 194 and 196 are formed below the piston assemblies within the cylindrical bores formed in the piston block portion 184 for this purpose. Accordingly, the cylinder bores are respectively closed by threaded plug members 198 and 200 within which conduit fittings 202 and 204 are threadedly received for connecting the cylinder bores to the connecting conduits of the closed fluid circuit.

The piston assemblies 190 and 192 include confronting rack portions 206 which mesh with the gear member 188 so that the piston assemblies will be simultaneously reciprocated in opposite directions. Each piston assembly is also provided with a tubular portion 208 slidable within the cylindrical bore in fluid sealing relation thereto so as to seal the expansible chambers 194 and 196 therebelow. The lower ends of the tubular portions 208 of the piston assemblies are closed by sealing plugs 210 within which a fluid passage 212 is formed. Also, the upper ends of the tubular portions 206 of the piston assemblies have passages 214 through which fluid communication is established between the reservoir chamber 182 and the expansible chambers 194 and 196 through the passages 212.

In the case of the piston assembly 190, a one-way check valve 216 is seated on the inner end of the sealing plug 210 for normally closing the fluid passage 212. Accordingly, the one-way check valve 216 is biased to its closed position by the spring 218 disposed within the tubular portion 208 of the piston assembly. The piston assembly 192 on the other hand also encloses a valve biasing spring 220 to normally seat a one-way check valve 222 at the upper end of the piston assembly for closing the passage 214. The one-way check valve 222 is however opened against the bias of the spring 220 when the piston assembly 192 reaches the upper end of its reciprocatory stroke by means of a valve opening rod 224 which is secured to the closing plate 180 and projects through the passage 214 as more clearly shown in FIGURE 16.

A relatively incompressible operating fluid is maintained within the reservoir chamber 182 of the master drive unit 160 under atmospheric pressure. When filling the system with the operating fluid, the actuating lever 172 of the master unit is oscillated between its limit positions determined by the reciprocatory stroke of the piston assemblies 190 and 192 in order to pump operating fluid into the closed fluid circuit associated with the system. With the piston assembly 192 in its upper position as shown in FIGURE 16, fluid under atmospheric pressure will be admitted past the opened check valve 222 into the chamber 196. Accordingly, when the piston assembly 192 is downwardly displaced toward its downward limit position, fluid under pressure will be supplied through conduit 164 to the chamber 194 within the drive unit 162. Continued reciprocatory movement of the piston assembly within the master unit 160 will therefore supply fluid under pressure for expansion of the chamber 194 within the drive unit 162 to which the conduit 164 is connected causing upward displacement of the piston assembly 190 of unit 162. Thus, the piston assembly 190 will reach the upper end of its stroke while at the same time the piston assembly 192 is displaced to the lower end of its stroke within the intermediate drive unit 162. Continued pumping action of the master unit will thereafter open the one-way check valve 216 so as to admit fluid into the reservoir chamber 182. At this time, the reservoir sealing cap 176 is removed from the drive unit 162 so that operating fluid may completely fill the reservoir chamber 182 after which the sealing cap 176 is replaced. Once the reservoir chamber 182 within the intermediate drive unit 162 is filled and the chamber sealed, continued pumping action of the master drive unit 160 will replace fluid transferred from reservoir chamber 182 to the chamber 196 upon opening of the check valve 222 within the piston assembly 192 at the upper end of its stroke. Accordingly, fluid may thereafter be transferred from chamber 196 of unit 162 to the expansible chamber 194 associated with the slave unit 158 by continued pumping action of the master unit 160. It will therefore be apparent that the slave unit may then be charged with fluid in the same manner as described in connection with the intermediate drive unit 162. Upon completion of the filling procedure, all of the reservoir chambers within the drive units 162 and 158 will be filled with fluid and sealed. The hydraulic remote control system 156 will then operate in a normal manner with all of the check valves maintained closed as in the case of the system 10 hereinbefore described in connection with FIGURE 1. Similarly, the system may at any time be synchronized by pumping the actuating lever 172 of the master unit 160 in order to develop a pressure in one of the expansible chambers 194 or 196 exceeding the normal maximum operating pressure of the system causing opening of the check valves in order to transfer operating fluid to make up any deficiency or relieve an excess in some portion of the fluid circuit as well as to accommodate any volumetric expansion or contraction of the operating fluid itself.

From the foregoing description, the construction, operation, utility and installation of the hydraulic remote control system of the present invention will be apparent. The ability of the system of the present invention to be synchronized and to fill itself with operating fluid in accordance with the procedures hereinbefore described, are obviously of advantageous import since it will reduce maintenance costs and avoid any prolonged periods during which the system is inoperative. Thus, the series connection of the drive units and its relationship to the fluid containing reservoir represent significant features of the invention. Furthermore, the arrangement of valves is such that they are normally actuated only in connection with the fluid filling and synchronizing procedures, and will at the same time provide automatic compensation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a fluid motion transmitting system including a reservoir containing a relatively incompressible fluid, at least two piston units each having a pair of oppositely expansible chambers and a closed fluid circuit interconnecting the piston units in series through said chambers, means for purging compressible fluid from said fluid circuit and synchronizing operation of said piston units comprising; filling valve means operatively connecting the reservoir to one of the chambers in one of said piston units for supply of the incompressible fluid thereto in response to volumetric expansion of said one of the chambers, fluid transfer valve means operatively connected to the fluid circuit in bypass relation to the chambers in the other of the piston units for transferring the incompressible fluid to the other of the chambers in said one of the piston units following filling of the chambers in the other of the piston units with the incompressible fluid, and excess fluid valve means connecting said other chamber in said one of the piston units to the reservoir for venting the compressible fluid and excess incompressible fluid supplied to the other chamber of said one of the piston units by the fluid circuit, said reservoir comprising vented chamber means enclosed within said one of the piston units and sealed chamber means enclosed within the other of the piston units.

2. The combination of claim 1 wherein each of said piston units includes a piston member, means mounting said piston member for displacement in opposite directions between limit positions, drive means connected to the piston member in said one of the piston units for mechanically displacing the piston member against an operating pressure of the incompressible fluid in the chambers, said fluid transfer valve means including a one-way check valve opened in response to pressure exceeding said operating pressure to conduct the incompressible fluid in one direction through the fluid circuit.

3. The combination of claim 1 wherein each of said piston units includes a pair of piston members and gear means interconnecting said piston members for simultaneous movement in opposite directions between limit positions.

4. The combination of claim 3 wherein said valve means comprises one-way check valves mounted by the piston members in each of the piston units establishing fluid communication between the pair of chambers and the chamber means, and means responsive to movement of the piston members to one of the limit positions for opening one of the check valves.

References Cited
UNITED STATES PATENTS

| | | | |
|---|---|---|---|
| 670,447 | 3/1901 | Fulton | 60—54.5 X |
| 976,907 | 11/1910 | Pagendarm | 60—54.5 |
| 1,831,238 | 11/1931 | Ferris | 60—54.5 X |
| 2,192,175 | 3/1940 | Ballard | 60—54.5 |
| 2,247,302 | 6/1941 | Levy | 60—54.5 |
| 2,597,050 | 5/1952 | Audemar | 60—54.5 |
| 2,657,535 | 11/1953 | Levy | 60—54.5 |
| 2,855,755 | 10/1958 | Auger | 60—54.5 |
| 2,915,016 | 12/1959 | Weaver et al. | 60—54.5 X |
| 3,040,533 | 6/1962 | Heinrich | 60—54.5 |
| 3,290,881 | 12/1966 | Boehs | 60—54.5 |

ROBERT R. BUNEVICH, *Examiner.*

EDGAR W. GEOGHEGAN, *Primary Examiner.*